United States Patent
Kim et al.

(10) Patent No.: US 12,158,376 B2
(45) Date of Patent: Dec. 3, 2024

(54) TEMPERATURE-SENSITIVE FILM AND TEMPERATURE MEASUREMENT SYSTEM USING THEREOF

(71) Applicant: PUSAN NATIONAL UNIVERSITY INDUSTRY-UNIVERSITY COOPERATION FOUNDATION, Busan (KR)

(72) Inventors: Kyung Chun Kim, Busan (KR); Chang Sik Ha, Busan (KR); Tao Cai, Busan (KR); Yongzhu Yan, Busan (KR)

(73) Assignee: PUSAN NATIONAL UNIVERSITY INDUSTRY-UNIVERSITY COOPERATION FOUNDATION, Busan (KR)

(*) Notice: Subject to any disclaimer, the term of this patent is extended or adjusted under 35 U.S.C. 154(b) by 579 days.

(21) Appl. No.: 17/599,903

(22) PCT Filed: Mar. 18, 2021

(86) PCT No.: PCT/KR2021/003322
§ 371 (c)(1),
(2) Date: Sep. 29, 2021

(87) PCT Pub. No.: WO2021/221313
PCT Pub. Date: Nov. 4, 2021

(65) Prior Publication Data
US 2022/0326095 A1 Oct. 13, 2022

(30) Foreign Application Priority Data

Apr. 28, 2020 (KR) .................. 10-2020-0051290
Mar. 15, 2021 (KR) .................. 10-2021-0033088

(51) Int. Cl.
*G01K 11/14* (2006.01)
*C08J 5/18* (2006.01)

(52) U.S. Cl.
CPC ............ *G01K 11/14* (2013.01); *C08J 5/18* (2013.01); *C08J 2379/08* (2013.01)

(58) Field of Classification Search
CPC ...... C08J 2479/08; C08J 3/247; C08J 7/0427; C08J 7/06; C08G 73/10; C09K 11/08; G01K 11/14
See application file for complete search history.

(56) References Cited

U.S. PATENT DOCUMENTS

2016/0280857 A1* 9/2016 Jeon .................. C08G 73/106

FOREIGN PATENT DOCUMENTS

| JP | 2009-149787 A | 7/2009 |
| JP | 2009-200350 A | 9/2009 |

(Continued)

OTHER PUBLICATIONS

Fabrication and luminescence properties of Eu-complex/polyimide composite nanoparticles https://link.springer.com/article/10.1007/s10853-008-3110-3 (Year: 2009).*

(Continued)

*Primary Examiner* — Catherine S Branch
*Assistant Examiner* — Olga Lucia Donahue
(74) *Attorney, Agent, or Firm* — Paratus Law Group, PLLC

(57) ABSTRACT

Disclosed is a temperature measurement system including: a light source unit for receiving excitation light; a target material on which the temperature-sensitive film is attached in order to emit the received excitation light into emission light; a phosphorescence detector for extracting the emission light into a phosphorescence decay signal; and a temperature extraction unit for extracting temperature of the target material using the phosphorescence decay signal.

3 Claims, 3 Drawing Sheets

(56) References Cited

FOREIGN PATENT DOCUMENTS

| | | |
|---|---|---|
| JP | 2017-186490 A | 10/2017 |
| KR | 10-1835218 B1 | 3/2018 |
| KR | 10-1843854 B1 | 3/2018 |

OTHER PUBLICATIONS

International Search Report for PCT/KR2021/003322 mailed Aug. 3, 2021 from Korean Intellectual Property Office.
Qinghua Li et al., "Absorption and Fluorescence Spectra and Thermal Properties of Novel Transparent Polyimides", Journal of Photopolymer Science and Technology, May 28, 1997, pp. 49-54, vol. 10, No. 1.
Tao Cai et al., "Effect of surface moisture on chemically bonded phosphor for thermographic phosphor thermometry", Measurement Science and Technology, Aug. 9, 2016, pp. 1-7.
Pradip Kumar Tapaswi et al., "Recent Trends on Transparent Colorless Polyimides with Balanced Thermal and Optical Properties: Design and Synthesis", Macromolecular Chemistry and Physics, 2019, pp. 1-33, vol. 220, No. 1800313.
Yongbing Zhuang et al., "Polyimides containing aliphatic/alicyclic segments in the main chains", Progress in Polymer Science, Feb. 14, 2019, pp. 35-88, vol. 92.

\* cited by examiner

TEMPERATURE-SENSITIVE FILM AND TEMPERATURE MEASUREMENT SYSTEM USING THEREOF

CROSS-REFERENCE TO PRIOR APPLICATIONS

This application is a National Stage Patent Application of PCT International Patent Application No. PCT/KR2021/003322 (filed on Mar. 18, 2021) under 35 U.S.C. § 371, which claims priority to Korean Patent Application Nos. 10-2020-0051290 (filed on Apr. 28, 2020) and 10-2021-0033088 (filed on Mar. 15, 2021), which are all hereby incorporated by reference in their entirety.

BACKGROUND

The present invention relates to a temperature-sensitive film and a temperature measurement system using the same, and more particularly, to a flexible temperature-sensitive film in which inorganic phosphorous materials of rare-earth metals and polyimide derivative compound are mixed evenly, and a contactless temperature measurement system which can measure a wide temperature range using the temperature-sensitive film.

Sensors play an important role in connecting the real world with a virtual world. With appearance and development of the modern industrial technology, such as intelligent bionic robots and automatic medical treatment, accurate acquisition of temperature signals is especially important in the modern engineering and applied science fields. Moreover, new application environment is beyond the functions of the existing measurement methods and presents a new challenge to acquisition of temperature signals, and various studies based on new temperature sensors are being carried out.

The existing temperature measurement technology is generally based on relationship among temperature and resistance, thermoelectricity effect (thermocouple), color rendering, sound velocity of gas, and spectral distribution of scattered or emitted electromagnetic thermal radiation. In the real application field, there are generally methods, such as a thermocouple and a radiation thermometer. However, in a poor environment, the existing thermocouple has several problems in that it ages rapidly and its lifespan is reduced due to a contact measurement method. The contact measurement method is limited in an application range. Furthermore, the contact measurement method cannot be applied to a moving object to be measured or a deformable object to be measured, is very sensitive to gray-white radiation and emission coefficients of the measured environment surface and the measured object surface, and reacts very sensitively to a measured optical coherence.

With development of intelligent bioengineering robots, biomedical technology and other technology, biology and machines began to combine with each other. Under the assumption to pursue a high accuracy of temperature sensors and long service lives, requirements for a high frequency response to sensors and biomass flexibility came to the fore. Therefore, development of flexible temperature sensors and temperature measurement methods for measuring temperature accurately and effectively is really meaningful in the latest advanced engineering technology.

Therefore, the present invention has been invented since the inventors of the present invention have recognized it was urgent to compensate the above-mentioned problems and to develop a temperature-sensitive film and a temperature measurement system using the same which are needed in various fields.

SUMMARY

Accordingly, the present invention has been made in an effort to solve the above-mentioned problems occurring in the prior arts, and it is an object of the present invention to provide a preparing method of a flexible temperature-sensitive film in which inorganic phosphorous materials of rare-earth metals and polyimide compound are mixed evenly.

It is another object of the present invention to provide a noncontact temperature measurement system including: a light source unit for receiving excitation light; a target material on which the temperature-sensitive film is attached in order to emit the received excitation light into emission light; a phosphorescence detector for extracting the emission light into a phosphorescence decay signal; and a temperature extraction unit for extracting temperature of the target material using the phosphorescence decay signal.

The technical problems to be solved by the present invention are not limited to the technical problems as mentioned above, and another technical problem, which is not mentioned, could be clearly understood by those having ordinary skill in the art to which the present invention pertains based on the description below.

To achieve the above objects, the present invention provides a preparing method of a temperature-sensitive film and a temperature measurement system using the temperature-sensitive film prepared.

Hereinafter, the present invention will be described in more detail.

The present invention provides a preparing method of a temperature-sensitive film including the following steps of:

(S1) mixing 4,4'-(Hexafluoroisopropylidene) diphthalic anhydride (6FDA), 4,4'-Methylenedicyclohexanamine (MCA), and N-methyl-2-pyrrolidone (NMP) to form a compound indicated by the following [Chemical formula 2]; and (S2) causing a thermal imidization reaction by adding inorganic phosphorous materials to the compound indicated by the following [Chemical formula 2] and preparing a temperature-sensitive film composed of a compound indicated by the following [Chemical formula 1],

[Chemical formula 1]

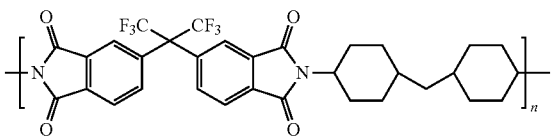

[Chemical formula 2]

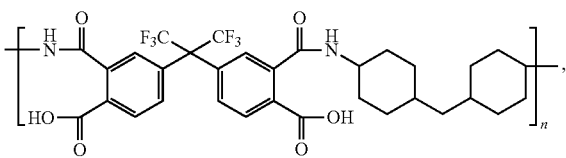

wherein the 'n' is within a range of 1 to 1,000,000,000.

In the present invention, the step (S1) includes the following steps of:
- (S1a) mixing MCA and NMP; and
- (S1b) adding 6FDA to the compound to prepare the compound indicated by the [Chemical formula 2], wherein a molar mass ratio of MCA to 6FDA ranges from 1:0.8 to 1:1.2.

In the present invention, the step (S2) includes the steps of:
- (S2a) adding inorganic phosphorous materials to the compound indicated by the [Chemical formula 2] to produce a mixture;
- (S2b) coating the compound on glass; and
- (S2c) performing a thermal imidization reaction to the coated compound at 120° C. to 350° C. in order to prepare a temperature-sensitive film consisting of the compound indicated by the [Chemical formula 1], wherein 1 to 20% by weight of the inorganic phosphorous materials are added based on the total % by weight of the compound indicated by the [Chemical formula 2].

In another aspect of the present invention, provided is a temperature measurement system including: a light source unit for receiving excitation light; a target material on which the temperature-sensitive film is attached in order to emit the received excitation light into emission light; a phosphorescence detector for extracting the emission light into a phosphorescence decay signal; and a temperature extraction unit for extracting temperature of the target material using the phosphorescence decay signal.

In the present invention, the light source unit comprises a signal generator for irradiating excitation light ranging from 350 nm to 450 nm.

In the present invention, the phosphorescence detector comprises a phosphorescence filter for obtaining a phosphorescence decay signal from the emission light, and the phosphorescence filter passes a wavelength band ranging from 600 to 680 nm.

In the present invention, the temperature extraction unit includes a signal processing unit for converting the phosphorescence decay signal into a calibration curve of phosphorescence lifetime-to-temperature. The phosphorescence decay signal is converted into the calibration curve of phosphorescence lifetime-to-temperature through a [Mathematical formula 1:

$$I(t)=I_0 \times \exp(-t/\tau)+b,$$  [Mathematical formula 1]

wherein $I(t)$ is intensity of phosphorescence over time, $I_0$ is intensity of phosphorescence under a state where excitation is completed, t is decay time, $\tau$ is a phosphorescence decay constant, and b is noise.

All matters mentioned in the preparing method of the temperature-sensitive film and the temperature measurement system using the temperature-sensitive film are applied equally unless they are contradictory to each other.

The preparing method of the temperature-sensitive film according to an embodiment of the present invention has flexibility and a wide measurement temperature range, is greatly resistant to poor surroundings, and is applicable to sports science and various application environments, such as objects that deformation is going on.

Furthermore, the temperature measurement system using the temperature-sensitive film according to an embodiment of the present invention has excellent dynamic responses since it is a noncontact type, can reach spatial resolution of the μm level and time resolution of 100 Hz, and is applicable to bioengineering, biomedics, and others since being prepared in a patch form attachable even to the skin due to flexibility of the temperature-sensitive film.

The effects of the present invention are not limited to the above-mentioned effects and further effects not described above will be clearly understood by those skilled in the art.

DETAILED DESCRIPTION

Figure 1:
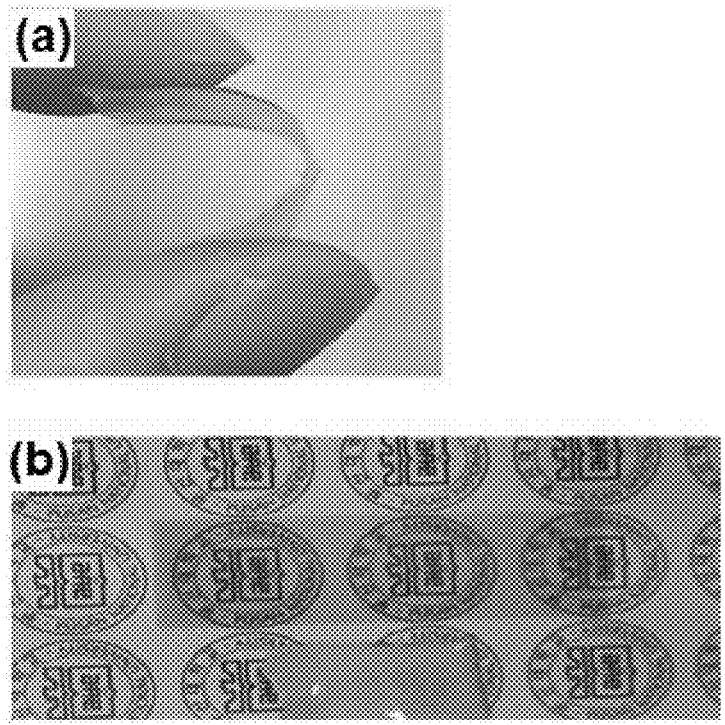
FIG. 1 illustrates flexible transparent temperature-sensitive films prepared according to an embodiment 1 (a) and an embodiment 2 (b) of the present invention.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Hereinafter, while the present invention will be described with reference to example embodiments in detail, it will be apparent that the present invention is not limited by the following embodiments.

Preparing Method of Temperature-Sensitive Film

The present invention provides a preparing method of a temperature-sensitive film including the following steps of:
- (S1) mixing 4,4'-(Hexafluoroisopropylidene) diphthalic anhydride (6FDA), 4,4'-Methylenedicyclohexanamine (MCA), and N-methyl-2-pyrrolidone (NMP) to form a compound indicated by the following [Chemical formula 2]; and
- (S2) causing a thermal imidization reaction by adding inorganic phosphorous materials to the compound indicated by the following [Chemical formula 2] and preparing a temperature-sensitive film composed of a compound indicated by the following [Chemical formula 1],

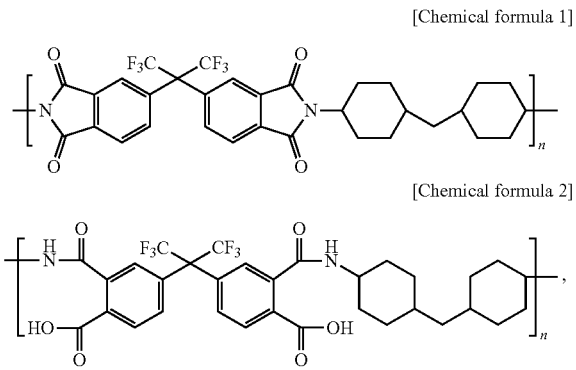

[Chemical formula 1]

[Chemical formula 2]

wherein the 'n' is within a range of 1 to 1,000,000,000.

In the present invention, the step (S1) includes the following steps of:
(S1a) mixing MCA and NMP; and
(S1b) adding 6FDA to the compound to prepare the compound indicated by the [Chemical formula 2].

In more detail, a molar mass ratio of MCA to 6FDA ranges from 1:0.8 to 1:1.2, preferably, ranges from 1:0.9 to 1:1.1. Moreover, the NMP may have the ratio of weight to volume (W/V) that W(MCA+6FDA)/V(NMP) satisfies from 0.1 to 0.2.

For instance, if the molar mass ratio of MCA (0.105 g, 0.5 mmol) to 6FDA (0.222 g, 0.5 mmol) is 1:1, the NMP satisfies that W(MCA(0.105 g)+6FDA(0.222 g))/V(NMP (mL)) ranges from 0.1 to 0.2. Therefore, the NMP may range from 1.635 to 3.27 mL. In other words, MCA (0.5 mmol) of 0.105 g and NMP of 1.636 to 3.27 mL are mixed, and then, 6FDA (0.5 mmol) of 0.222 g is added to the mixture.

The step (Sla) may be carried out while stirring under a nonreactive gas condition, The nonreactive gas may be helium, argon or nitrogen, preferably, argon or nitrogen, and most preferably, nitrogen.

In the step (Sib), the 6FDA drops slowly to the mixture produced in the step (Sla) at room temperature, and is stirred at the same time.

The compound indicated by the [Chemical formula 2] and produced in the step (S1) has viscosity.

The step (S2) is a step of preparing a temperature-sensitive film consisting of the compound indicated by the [Chemical formula 1], by adding the inorganic phosphorous materials to the compound indicated by the [Chemical formula 2] and produced in the step (S1) and performing a thermal imidization. The step (S2) includes the following steps of:
(S2a) adding inorganic phosphorous materials to the compound indicated by the [Chemical formula 2] to produce a mixture;
(S2b) coating the compound on glass; and
(S2c) performing a thermal imidization reaction to the coated compound at 120° C. to 350° C. in order to prepare a temperature-sensitive film consisting of the compound indicated by the [Chemical formula 1], and wherein The inorganic phosphorous materials may be phosphorous materials including rare-earth metals or transition metals. In more detail, the inorganic phosphorous materials may be phosphorous materials including rare-earth metals or transition metals of one or more kinds selected from a group consisting of $Eu^{2+}$, $Eu^{3+}$, $Mn^{4+}$, $Mn^{2+}$ and $Sm^{2+}$, preferably, phosphorous materials including rare-earth metals or transition metals of one or more kinds selected from a group consisting of $Y_2O_3:Eu^{3+}$, $Y_2O_2S:Eu^{3+}$, $TiO_2:Eu^{3+}$, $Gd_2O_3:Eu^{3+}$, $GdAlO_3:Eu^{3+}$, $La_2O_2S:Eu^{3+}$, $BaMg_2Al_{10}O_{17}:Eu^{2+}$, $(Sr,Mg)_2SiO_4:Eu^{2+}$, $Mg_4FGeO_6:Mn^{4+}$, $TiMg_2O_4:Mn^{4+}$, $ZnGa_2O_4:Mn^{2+}$, $ZnSiO_4:Mn^{2+}$, $BaFCl:Sm^{2+}$, $CaFCl:Sm^{2+}$ and $SrFCl:Sm^{2+}$, and the most preferably, phosphorous materials including rare-earth metals or transition metals of one or more kinds selected from a group consisting of $Y_2O_2S:Eu^{3+}$, $La_2O_2S:Eu^{3+}$, $BaMg_2Al_{10}O_{17}:Eu^{2+}$, $Mg_4FGeO_6:Mn^{4+}$, $ZnSiO_4:Mn^{2+}$ and $SrFCl:Sm^{2+}$.

The inorganic phosphorous materials are particles of 0.1 μm to 10 μm. In more detail, if the particle size of the inorganic phosphorous materials is less than 0.1 μm, it is impossible to prepare fluorescent particles, and if the particle size of the inorganic phosphorous materials exceeds 0.1 μm, the surface of the polyimide compound indicated by the [Chemical formula 2] becomes rough. Therefore, it is preferable that the particle size of the inorganic phosphorous materials range from 0.1 μm to 10 μm.

1 to 20% by weight, preferably, 1 to 16% by weight, of the inorganic phosphorous materials may be added based on the total % by weight of the compound indicated by the [Chemical formula 2].

In the step (S2a), the inorganic phosphorous materials and the compound indicated by the [Chemical formula 2] are mixed by stirring, and the stirring is carried out for 0.5 to 5 hours.

The step (S2b) may be a step of coating the mixture prepared in the step (S2a) on glass. In more detail, the mixture prepared in the step (S2a) is coated on a clean cover glass, and then, coating is carried out in a vacuum oven at 50 to 80° C. for one to eight hours.

Before the step (S2c), a step of preprocessing the coated mixture at 60 to 95° C. is added. The preprocessing may be repeated once to three times, and may be carried out for 0.5 to 3 hours.

The step (S2c) may be a step of finally preparing a temperature-sensitive film consisting of the compound indicated by the [Chemical formula 1] through a thermal imidization reaction. In more detail, the thermal imidization reaction is applied to the mixture coated in the step (S2b) at 120 to 350° C., preferably, a first thermal imidization reaction is applied to the mixture at 120 to 220° C., a second thermal imidization reaction is applied to the mixture at 220 to 280° C., and a third thermal imidization reaction is applied to the mixture at 280 to 350° C. Additionally, if the thermal imidization reaction is carried out less than 100° C., the thermal imidization reaction is not caused, and if thermal imidization reaction is carried out more than 350° C., the prepared film is burned, and so, cannot be prepared in the form of a film.

The thermal imidization reaction may be carried out while stirring under a nonreactive gas condition, The nonreactive gas may be helium, argon or nitrogen, preferably, argon or nitrogen, and most preferably, nitrogen. In addition, the thermal imidization reaction may be carried out for 0.1 to 5 hours, preferably, 0.5 to 3 hours.

The temperature-sensitive film may be transparent or translucent, and may be 10 μm to 500 μm in thickness.

Temperature Measurement System

The present invention provides a temperature measurement system including: a light source unit 10 for receiving excitation light; a target material 20 on which a temperature-sensitive film is attached in order to emit the received excitation light into emission light; a phosphorescence detector 30 for extracting the emission light into a phosphorescence decay signal; and a temperature extraction unit 40 for extracting temperature of the target material 20 using the phosphorescence decay signal.

The temperature-sensitive film 21 may be prepared and applied in the same way as the above mentioned.

The light source unit 10 can irradiate excitation light ranging from 350 nm to 450 nm, and includes a signal generator 11 having an excitation light output value ranging from 0.1 to 15 W.

The light source unit 10 includes an excitation light source 12 which irradiates LED or laser as excitation light, and the excitation light source 12 is controlled by a pulse signal generated through the signal generator 11.

The excitation light source 12 is controlled by a pulse signal having a pulse width ranging from 1 to 75 ms and a pulse period ranging from 10 to 1,500 ms through the signal generator 11.

According to an embodiment of the present invention, the light source unit 10 controls the excitation light source 12 by the pulse signal having the pulse width ranging from 1 to 75 ms and the pulse period ranging from 10 to 1,500 ms through the signal generator 11, and the excitation light source 12 is irradiated in wavelength ranging from 350 to 450 nm at an excitation light output value ranging from 0.1 to 15 W.

The target material 20 is a material of which the temperature is measured when the excitation light received from the light source unit 10 is emitted as the emission light.

Moreover, the target material 20 may be a metallic material to which the temperature-sensitive film 21 is attached.

The phosphorescence detector 30 can extract a phosphorescence decay signal using the emission light received from the target material 20.

The phosphorescence detector 30 may be a CCD camera or a CMOS high speed camera, and is not limited to the above if the phosphorescence detector 30 can measure to detect the emission light emitted from the target material 20.

Furthermore, the phosphorescence detector 30 has a phosphorescence filter 31 mounted to filter the phosphorescence decay signal as a temperature-related phosphorescence signal, and the phosphorescence filter 31 can pass a wavelength band ranging from 600 to 680 nm.

According to an embodiment of the present invention, the excitation light received by the light source unit 10 is emitted by the temperature-sensitive film 21 attached to the target material 20. The emission light emitted is filtered as the temperature-related phosphorescence signal and is extracted as the phosphorescence decay signal while passing through the phosphorescence filter 31.

The temperature extraction unit 40 finally extracts temperature of the target material 20.

The temperature extraction unit 40 includes a signal processing unit 41 for converting the phosphorescence decay signal extracted by the phosphorescence detector 30 into a calibration curve of phosphorescence lifetime-to-temperature.

The phosphorescence decay signal is converted into the calibration curve of phosphorescence lifetime-to-temperature through the following [Mathematical formula 1] in the signal processing unit 41:

$$I(t) = I_0 \times \exp(-t/\tau) + b,$$ [Mathematical formula 1]

wherein I(t) is intensity of phosphorescence over time, $I_0$ is intensity of phosphorescence under a state where excitation is completed, t is decay time, τ is a phosphorescence decay constant, and b is noise.

The temperature measurement system 1 can be used in temperature measurement in various industrial fields, such as temperature measurement for industry, AI robots, biotechnology, or medical technology, since measuring temperature of a target material having a wide temperature range from −200 to 400° C.

The advantages and features of the present invention and methods of achieving them will be apparent from the following exemplary embodiments that will be described in more detail with reference to the accompanying drawings. It should be noted, however, that the present invention is not limited to the following exemplary embodiments, and may be implemented in various forms. Accordingly, the exemplary embodiments are provided only to disclose the present invention and let those skilled in the art know the category of the present invention. In the drawings, embodiments of the present invention are not limited to the specific examples provided herein and are exaggerated for clarity. The same reference numerals or the same reference designators denote the same elements throughout the specification.

Embodiment 1. Preparing of Temperature-Sensitive Film 1

1.1 Preparation of Compound Indicated by [Chemical Formula 2]

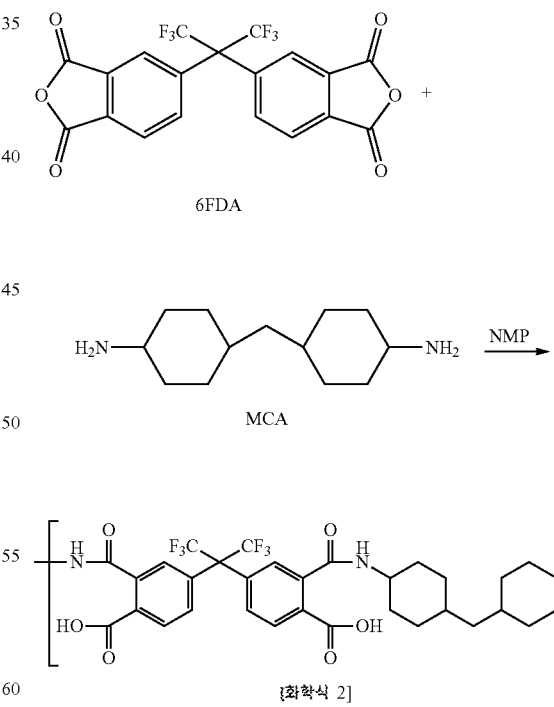

MCA (0.5 mmol) of 0.105 g and NMP of 2.2 mL were mixed in a glass reactor under a nitrogen condition. Moreover, 6FDA (0.5 mmol) of 0.222 g was stirred while slowly dropping to the mixture at room temperature. So, the compound indicated by the [Chemical formula 2] was prepared.

1.2 Preparing of Temperature-Sensitive Film 1 Consisting of Compound Indicated by [Chemical Formula 1]

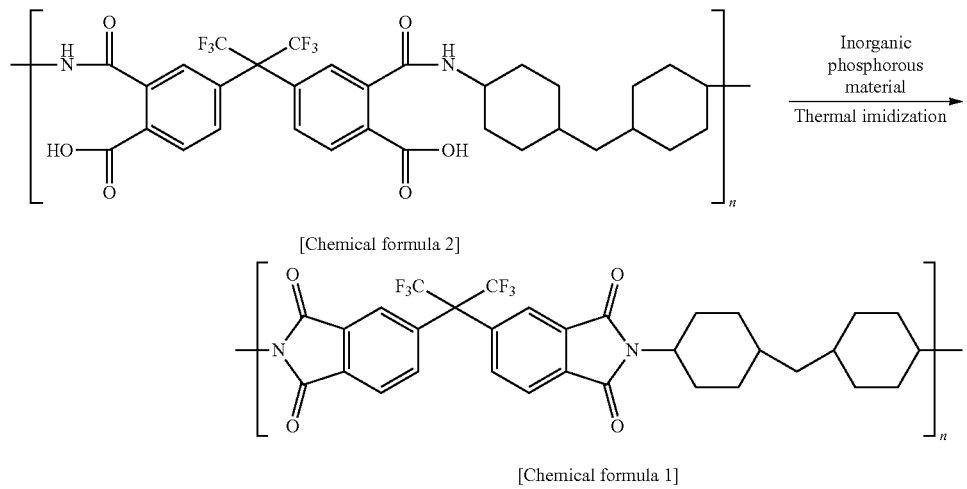

[Chemical formula 2]

[Chemical formula 1]

An inorganic phosphorous material ($Mg_4FGeO_6:Mn^{4+}$) having particles of 5 μm was added to the compound indicated by the [Chemical formula 2], and then, was strongly stirred for one hour so as to obtain a mixture. In this instance, the inorganic phosphorous material added was 10% by weight based on the total % by weight of the compound indicated by the [Chemical formula 2]. Furthermore, the mixture was coated on a cover glass evenly, and then, was coated in a vacuum oven at 60° C. for four hours. Next, the coated material was preprocessed at 80° C. for two hours, and then, a thermal imidization reaction was carried out under the nitrogen condition at 160° C., 240° C. and 300° C. in sequence for one hour. Therefore, a transparent temperature-sensitive film 1 consisting of the compound indicated by the [Chemical formula 1] was prepared. The temperature-sensitive film 1 is illustrated in FIG. 1(a).

Referring to FIG. 1(a), it is confirmed that the temperature-sensitive film 1 according to an embodiment of the present invention is flexible and transparent, and has thickness of 20 μm.

Embodiment 2. Preparing of Temperature-Sensitive Film 2

An inorganic phosphorous material ($Y_2O_2S:Eu^{3+}$) having particles of 5 μm was added to the compound indicated by the [Chemical formula 2], and then, was strongly stirred for one hour so as to obtain a mixture. In this instance, the inorganic phosphorous material added was 5% by weight based on the total % by weight of the compound indicated by the [Chemical formula 2]. Furthermore, the mixture was coated on a cover glass evenly, and then, was coated in a vacuum oven at 60° C. for four hours. Next, the coated material was preprocessed at 80° C. for two hours, and then, a thermal imidization reaction was carried out under the nitrogen condition at 160° C., 240° C. and 300° C. in sequence for one hour. Therefore, a transparent temperature-sensitive film 2 was prepared. The temperature-sensitive film 1 is illustrated in FIG. 1(b).

Referring to FIG. 1(b), it is confirmed that the temperature-sensitive film 1 according to an embodiment of the present invention is flexible and transparent, and has thickness of 10 μm.

Experimental Example 1. Temperature-Sensitive Film Effect 1.1 EFFECTS DUE TO DIFFERENCE IN WEIGHT PERCENT OF INORGANIC PHOSPHOROUS MATERIAL USED IN PREPARING PROCESS An inorganic phosphorous material ($Mg_4FGeO_6:Mn^{4+}$) having particles of 5 μm was added to the compound indicated by the [Chemical formula 2], which was prepared in the embodiment 1, and then, was strongly stirred for one hour so as to obtain a mixture. In this instance, the inorganic phosphorous material added was 35% by weight based on the total % by weight of the compound indicated by the [Chemical formula 2]. Furthermore, the mixture was coated on a cover glass evenly, and then, was coated in a vacuum oven at 60° C. for four hours. Next, the coated material was preprocessed at 80° C. for two hours, and then, a thermal imidization reaction was carried out under the nitrogen condition at 160° C., 240° C. and 300° C. in sequence for one hour. Therefore, a comparative temperature-sensitive film 1 was prepared. The temperature-sensitive film 1 is illustrated in FIG. 2(a).

Figure 2:
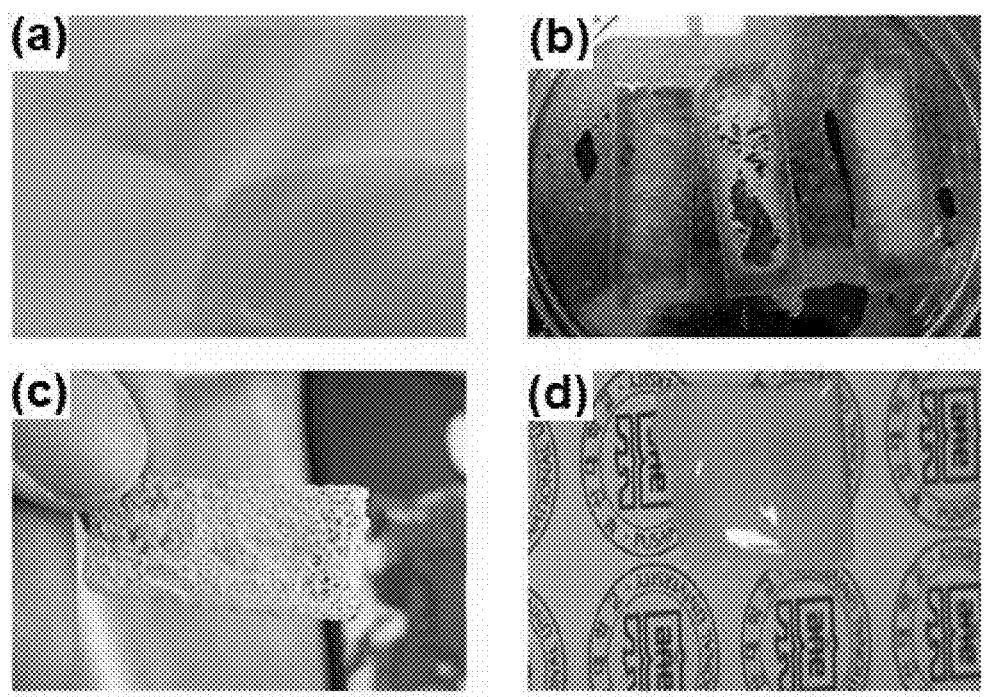
FIG. 2 illustrates temperature-sensitive films prepared according to comparative examples 1 to 4 (a)-(d) of the present invention.

Referring to FIG. 2(a), it is confirmed that the comparative temperature-sensitive film 1 is friable since the ratio of the added inorganic phosphorous material is too high.

1.2 Effect Depending on Existence of Reaction Gas Used in Preparing Process

All preparing processes were carried out not under a nonreactive gas condition but under an air condition, and besides the above, all preparing processes were carried out in the same condition as the embodiment 1 in order to obtain a comparative temperature-sensitive film 2. The temperature-sensitive film 2 is illustrated in FIG. 2(b).

Referring to FIG. 2(b), it is confirmed that the comparative temperature-sensitive film 2 cannot keep the film form and is blackened and burned since there is no nonreactive gas protected during the reaction.

1.3 Effect Depending on Difference in Molar Mass Ratio of MCA to 6FDA Used in Preparing Process The preparing process was carried out in a molar mass ratio of MCA to 6FDA which is 1:5, and besides the above, all preparing processes were carried out in the same condition as the embodiment 1 in order to obtain a comparative temperature-sensitive film 3. The temperature-sensitive film 3 is illustrated in FIG. 2(c).

Referring to FIG. 2(c), it is confirmed that a flexible transparent film is not formed but a friable film of a dry porous type is formed due to a difference in a ratio of MCA to 6FDA forming the temperature-sensitive film.

1.4 Effect Depending on Temperature of Thermal Imidization Reaction in Preparing Process The thermal imidization reaction was carried out at 50° C. three times, and besides the above, all preparing processes were carried out in the same condition as the embodiment 1 in order to obtain a comparative temperature-sensitive film 4. The temperature-sensitive film 4 is illustrated in FIG. 2(d).

Referring to FIG. 2(d), it is confirmed that the prepared temperature-sensitive film is too thick and cannot emit excitation light even though light is irradiated since temperature to carry out the thermal imidization reaction is too low.

Experimental Example 2. Temperature Measurement System

Figure 3:
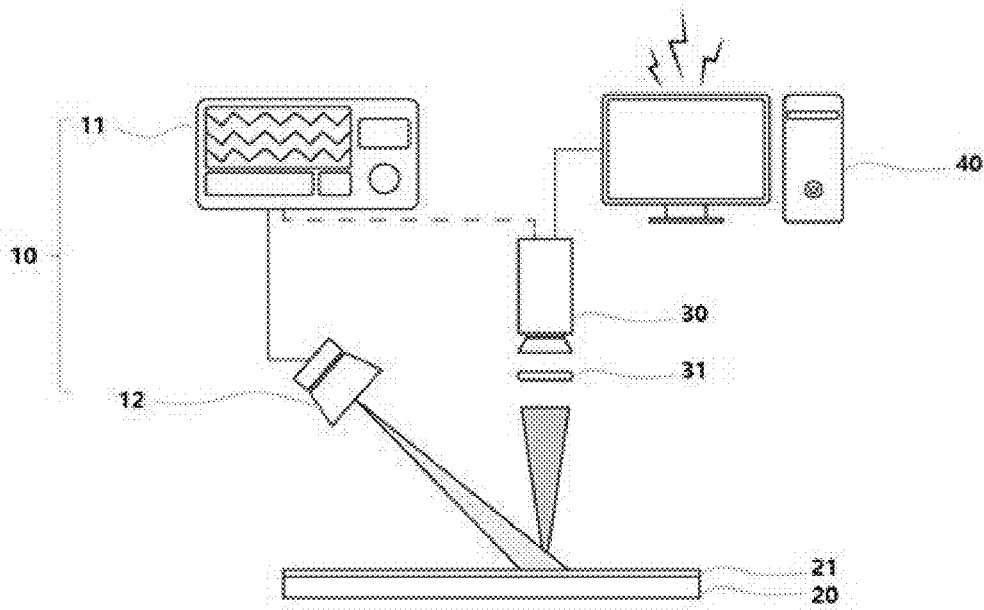
FIG. 3 is a schematic diagram illustrating a configuration of a temperature measurement system according to an embodiment of the present invention.

Temperature of an aluminum plate (target material) on which the temperature-sensitive film prepared in the embodiment 1 was measured using the temperature measurement system illustrated in FIG. 3.

Figure 4:
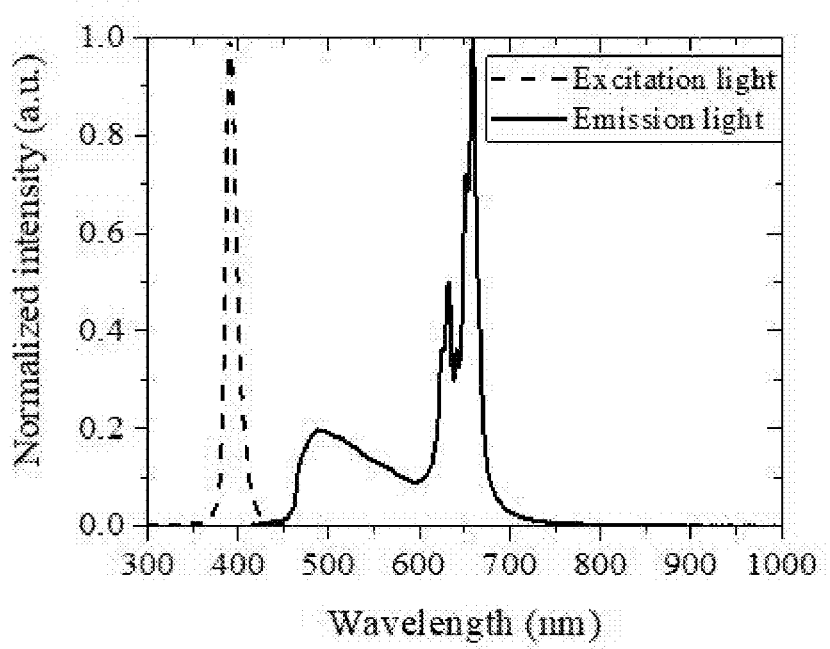
FIG. 4 is a view illustrating a phosphorescence signal spectrum of excitation light irradiated and emission light emitted in an experimental example 1.
Figure 5:
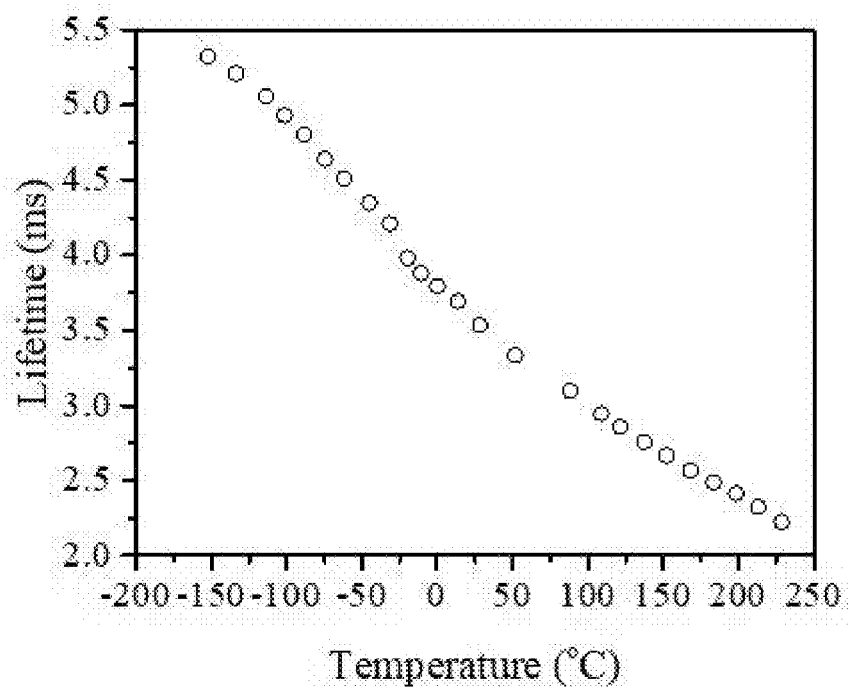
FIG. 5 is a view illustrating a spectrum that a phosphorescence decay signal extracted according to the experimental example 1 into a calibration curve of phosphorescence lifetime-to-temperature.

First, the signal generator generated a pulse signal with a pulse width of 50 ms and a pulse period of 1,000 ms in order to control excitation light. The excitation light had an excitation light output value of 10 W and was irradiated at a wavelength of 385 nm (indicated by a solid line in FIG. 4). The excitation light was an LED. Next, the excitation light received by the light source unit was emitted by the temperature-sensitive film attached to the target material, and the emission light (indicated by a dotted line in FIG. 4) passed through the phosphorescence filter to be filtered into a temperature-related phosphorescence signal to be extracted as a phosphorescence decay signal. Additionally, the signal processing unit converted the phosphorescence decay signal into a calibration curve of phosphorescence lifetime-to-temperature through the [Mathematical formula 1] (refer to FIG. 5), and finally, a temperature distribution of the aluminum plate (target material) relative to the calibration curve of phosphorescence lifetime-to-temperature is illustrated in FIG. 6.

Figure 6:
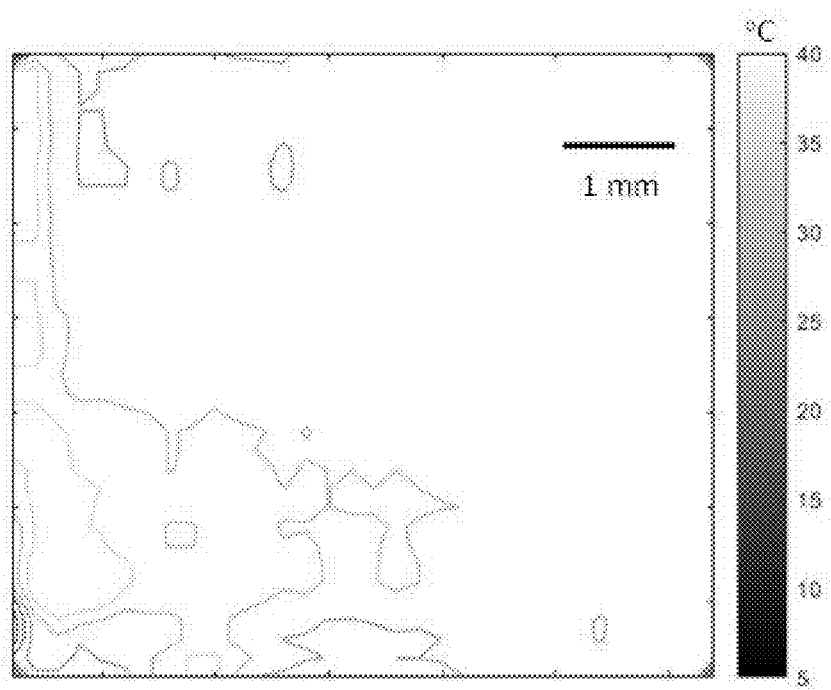
FIG. 6 is a view illustrating a temperature distribution result of a target material deduced by the calibration curve of phosphorescence lifetime-to-temperature extracted according to the experimental example 1.

Referring to FIG. 6, it is confirmed that edges of the aluminum plate (target material) is relatively low in temperature and shows temperature gradient distribution and high spatial resolution.

The above description is only exemplary, and it will be understood by those skilled in the art that the invention may be embodied in other concrete forms without changing the technological scope and essential features. Therefore, the above-described embodiments should be considered only as examples in all aspects and not for purposes of limitation.

The invention claimed is:

1. A preparing method of a temperature-sensitive film comprising the steps of:
   (S1) mixing 4,4'-(Hexafluoroisopropylidene) diphthalic anhydride (6FDA), 4,4'-Methylenedicyclohexanamine (MCA), and N-methyl-2-pyrrolidone (NMP) to form a compound indicated by a [Chemical formula 2]; and
   (S2) causing a thermal imidization reaction by adding inorganic phosphorous materials to the compound indicated by the [Chemical formula 2] and preparing a temperature-sensitive film composed of a compound indicated by a [Chemical formula 1],

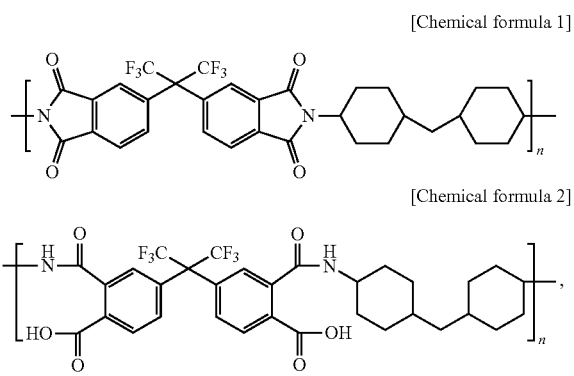

wherein the 'n' is within a range of 1 to 1,000,000,000,
wherein the inorganic phosphorous materials are phosphorus materials comprising rare-earth metals or transition metals, and
wherein steps (S1) and (S2) are performed in nonreactive gas conditions.

2. The preparing method according to claim 1, wherein the step (S1) comprises the steps of:
   (S1a) mixing MCA and NMP to form a mixture; and
   (S1b) adding 6FDA to the mixture to prepare the compound indicated by the [Chemical formula 2],
   wherein a molar mass ratio of MCA to 6FDA ranges from 1:0.8 to 1:1.2.

3. The preparing method according to claim 1, wherein the step (S2) comprises the steps of:
   (S2a) adding inorganic phosphorous materials to the compound indicated by the [Chemical formula 2] to produce a mixture;
   (S2b) coating the compound on glass; and
   (S2c) performing a thermal imidization reaction to the coated compound at 120° C. to 350° C. in order to prepare a temperature-sensitive film consisting of the compound indicated by the [Chemical formula 1], and
   wherein 1 to 20% by weight of the inorganic phosphorous materials are added based on the total % by weight of the compound indicated by the [Chemical formula 2].

* * * * *